United States Patent
Lauer et al.

(10) Patent No.: US 8,081,969 B2
(45) Date of Patent: Dec. 20, 2011

(54) SYSTEM FOR CREATING AN AIRCRAFT-BASED INTERNET PROTOCOL SUBNET IN AN AIRBORNE WIRELESS CELLULAR NETWORK

(75) Inventors: Bryan A. Lauer, Hinckley, IL (US);
Jerry Stamatopoulos, North Aurora, IL (US); Anjum Rashid, Bloomingdale, IL (US); Joseph Alan Tobin, Chicago, IL (US); Patrick Jay Walsh, Naperville, IL (US); Steven J. Arntzen, Dixon, IL (US)

(73) Assignee: Gogo LLC, Itasca, IL (US)

( * ) Notice: Subject to any disclaimer, the term of this patent is extended or adjusted under 35 U.S.C. 154(b) by 704 days.

(21) Appl. No.: 12/060,662

(22) Filed: Apr. 1, 2008

(65) Prior Publication Data

US 2008/0181169 A1 Jul. 31, 2008

Related U.S. Application Data

(63) Continuation-in-part of application No. 11/492,545, filed on Jul. 24, 2006, now Pat. No. 7,751,815, which is a continuation of application No. 10/730,329, filed on Dec. 7, 2003, now Pat. No. 7,113,780, which is a continuation-in-part of application No. 09/686,923, filed on Oct. 11, 2000, now Pat. No. 6,788,935.

(51) Int. Cl.
*H04W 4/00* (2009.01)
*H04W 24/00* (2009.01)

(52) U.S. Cl. ............ 455/431; 455/456.3; 455/430

(58) Field of Classification Search ............ 455/431, 455/414.1, 3.02, 430, 436, 442, 432.1, 439; 709/246, 250
See application file for complete search history.

(56) References Cited

U.S. PATENT DOCUMENTS

| | | | |
|---|---|---|---|
| 5,042,027 A | 8/1991 | Takase et al. | |
| 5,123,112 A | 6/1992 | Choate | |
| 5,134,709 A | 7/1992 | Bi et al. | |
| 5,212,804 A | 5/1993 | Choate | |
| 5,408,515 A | 4/1995 | Bhagat et al. | |
| 5,432,841 A | 7/1995 | Rimer | |
| 5,519,761 A * | 5/1996 | Gilhousen | 455/431 |

(Continued)

OTHER PUBLICATIONS

In the US Patent and Trademark Office in re: U.S. Appl. No. 11/414,873, Non-Final Office Action dated Oct. 15, 2009, 7 pages.

(Continued)

*Primary Examiner* — Kiet Doan
(74) *Attorney, Agent, or Firm* — Patton Boggs LLP (57) ABSTRACT

The Aircraft IP Subnet System provides wireless communication services to passengers located onboard an aircraft by storing data indicative of individually identified wireless devices that are located onboard the aircraft. The Aircraft IP Subnet System assigns a single IP address to each Point-to-Point Protocol link connecting the aircraft network to the ground-based communication network and creates an IP subnet onboard the aircraft. The IP subnet utilizes a plurality of IP addresses for each Point-to-Point link, thereby to enable each passenger wireless device to be uniquely identified with their own IP address. This is enabled since both Point-to-Point Protocol IPCP endpoints have pre-defined IP address pools and/or topology configured, so each Point-to-Point Protocol endpoint can utilize a greater number of IP addresses than one per link. Such an approach does not change IPCP or other EVDO protocols/messaging but allows this address to be directly visible to the ground-based communication network.

16 Claims, 9 Drawing Sheets

U.S. PATENT DOCUMENTS

| | | |
|---|---|---|
| 5,555,444 A | 9/1996 | Diekelman et al. |
| 5,590,395 A | 12/1996 | Diekelman |
| 5,651,050 A | 7/1997 | Bhagat et al. |
| 5,659,304 A | 8/1997 | Chakraborty |
| 5,678,174 A | 10/1997 | Tayloe |
| 5,740,535 A | 4/1998 | Rune |
| 5,754,959 A | 5/1998 | Ueno et al. |
| 5,805,683 A | 9/1998 | Berberich, Jr. |
| 5,887,258 A | 3/1999 | Lemozit et al. |
| 5,950,129 A | 9/1999 | Schmid et al. |
| 5,956,644 A | 9/1999 | Miller et al. |
| 5,995,805 A | 11/1999 | Ogasawara et al. |
| 6,002,944 A | 12/1999 | Beyda |
| 6,009,330 A | 12/1999 | Kennedy, III et al. |
| 6,055,425 A | 4/2000 | Sinivaara et al. |
| 6,144,338 A | 11/2000 | Davies |
| 6,233,448 B1 | 5/2001 | Alperovich et al. |
| 6,263,206 B1 | 7/2001 | Potochniak et al. |
| 6,314,286 B1 | 11/2001 | Zicker |
| 6,321,084 B1 | 11/2001 | Horrer |
| 6,324,398 B1 | 11/2001 | Lanzerotti et al. |
| 6,392,692 B1 | 5/2002 | Monroe |
| 6,393,281 B1 | 5/2002 | Capone et al. |
| 6,430,412 B1 | 8/2002 | Hogg et al. |
| 6,577,419 B1 | 6/2003 | Hall et al. |
| 6,580,915 B1 | 6/2003 | Kroll |
| 6,690,928 B1 | 2/2004 | Konishi et al. |
| 6,735,438 B1 | 5/2004 | Sabatino |
| 6,735,500 B2 | 5/2004 | Nicholas et al. |
| 6,754,489 B1 | 6/2004 | Roux et al. |
| 6,760,778 B1 * | 7/2004 | Nelson et al. ............... 709/246 |
| 6,788,935 B1 | 9/2004 | McKenna et al. |
| 6,889,042 B2 | 5/2005 | Rousseau et al. |
| 6,948,003 B1 * | 9/2005 | Newman et al. ............ 709/250 |
| 7,003,293 B2 | 2/2006 | D'Annunzio |
| RE40,476 E | 9/2008 | Leuca et al. |
| 7,486,690 B2 | 2/2009 | Maeda |
| 7,599,691 B1 * | 10/2009 | Mitchell ....................... 455/431 |
| 2002/0045444 A1 | 4/2002 | Usher et al. |
| 2002/0123344 A1 | 9/2002 | Criqui et al. |
| 2002/0155833 A1 | 10/2002 | Borel |
| 2003/0050746 A1 | 3/2003 | Baiada et al. |
| 2004/0102188 A1 | 5/2004 | Boyer et al. |
| 2004/0142658 A1 | 7/2004 | McKenna et al. |
| 2004/0152446 A1 | 8/2004 | Saunders et al. |
| 2004/0203918 A1 | 10/2004 | Moriguchi et al. |
| 2005/0053026 A1 | 3/2005 | Mullan et al. |
| 2005/0071076 A1 | 3/2005 | Baiada et al. |
| 2005/0220055 A1 | 10/2005 | Nelson et al. |
| 2005/0221875 A1 | 10/2005 | Grossman et al. |
| 2006/0229070 A1 | 10/2006 | de La Chapelle et al. |
| 2007/0021117 A1 | 1/2007 | McKenna et al. |
| 2007/0064604 A1 | 3/2007 | Chen et al. |
| 2007/0087756 A1 | 4/2007 | Hoffberg |
| 2007/0105600 A1 | 5/2007 | Mohanty et al. |
| 2007/0111725 A1 | 5/2007 | Kauffman et al. |
| 2008/0039076 A1 | 2/2008 | Ziarno et al. |
| 2009/0080368 A1 | 3/2009 | Bengeult et al. |

OTHER PUBLICATIONS

In the US Patent and Trademark Office in re: U.S. Appl. No. 12/021,169, Non-Final Office Action dated Jul. 14, 2009 (10 pages); response filed Oct. 7, 2009 (16 pages).

In the US Patent and Trademark Office in re: U.S. Appl. No. 12/060,674, Non-Final Office Action dated Jul. 9, 2009, 14 pages; and response filed Oct. 9, 2009, 17 pages.

In the US Patent and Trademark Office in re: U.S. Appl. No. 12/423,555, Non-Final Office Action dated Nov. 10, 2009, 7 pages.

International Search Report issued Nov. 6, 2009 in co-pending application PCT/US2009/036155.

* cited by examiner

SYSTEM FOR CREATING AN AIRCRAFT-BASED INTERNET PROTOCOL SUBNET IN AN AIRBORNE WIRELESS CELLULAR NETWORK

CROSS-REFERENCE TO RELATED APPLICATIONS

This application is a continuation-in-part of U.S. patent application Ser. No. 11/492,545 filed Jul. 24, 2006; which is a continuation of U.S. patent application Ser. No. 10/730,329 filed Dec. 7, 2003, now U.S. Pat. No. 7,113,780 issued Sep. 26, 2006; which is a continuation-in-part of U.S. patent application Ser. No. 09/686,923 filed Oct. 11, 2000, now U.S. Pat. No. 6,788,935 issued Sep. 7, 2004. This application is also related to U.S. patent application titled "Ground-Based Access Network Which Assigns Individual Internet Protocol Addresses To Wireless Devices In An Airborne Wireless Network" and filed on the same date as the present application. This application is also related to U.S. patent application titled "System For Managing Mobile Internet Protocol Addresses In An Airborne Wireless Cellular Network" and filed on the same date as the present application.

FIELD OF THE INVENTION

This invention relates to cellular communications and, in particular, to a system that creates an Internet Protocol-based subnet onboard an aircraft in an airborne wireless cellular network.

BACKGROUND OF THE INVENTION

It is a problem in the field of wireless communications to manage the wireless services provided by an aircraft network to passengers who are located in the aircraft as they roam among cell sites in the non-terrestrial cellular communication network. The aircraft network serves a plurality of subscribers, yet has a link to the ground-based network via a wide bandwidth connection that concurrently serves multiple individual subscribers. The management of this wide bandwidth connection to enable the individual identification of aircraft-based subscribers has yet to be addressed in existing wireless networks.

In the field of terrestrial cellular communications, it is common for a wireless subscriber to move throughout the area served by the network of their home cellular service provider and maintain their desired subscriber feature set. Feature set availability throughout the home network is managed by the home cellular service provider's database, often termed a Home Location Register (HLR), with data connections to one or more switches (packet or circuit), and various ancillary equipment, such as voice mail and short message servers, to enable this seamless feature set management. Each subscriber is associated with a one-to-one communication connection, which comprises a channel on the serving cell site, to access the desired communication services.

If the wireless subscriber were to transition inter-network, from the coverage area of their home cellular network to a network of the same or another cellular service provider (termed "roaming cellular service provider" herein), the wireless subscriber should have the ability to originate and receive calls in a unified manner, regardless of their location. In addition, it should be possible for a given wireless subscriber's feature set to move transparently with them. However, for this feature set transportability to occur, there needs to be database file sharing wherein the home cellular service Home Location Register (HLR) transfers the subscriber's authorized feature set profile to the roaming cellular service provider's database, often called a Visitor Location Register (VLR). The VLR then recognizes that a given roaming wireless subscriber is authorized for a certain feature set and enables the roaming cellular service provider network to transparently offer these features to the wireless subscriber. In this manner, the roaming wireless subscriber retains the same authorized feature set, or "subscriber class", as they had on their home cellular service provider network.

When wireless subscribers enter the non-terrestrial cellular communication network (that is, they fly in an aircraft as passengers), they encounter a unique environment that traditionally has been disconnected from the terrestrial cellular network, where the wireless network of the aircraft interfaces the subscriber (also termed "passenger" herein) to various services and content. The aircraft wireless network, therefore, can function as a content filter or can create unique types of content that are directed to the individual passengers who are onboard the aircraft. However, although the aircraft network serves a plurality of passengers, it has a link to the ground-based access network via a wide bandwidth radio frequency connection that has a single IP address on the ground-based access network. Thus, the wide bandwidth radio frequency connection concurrently carries the communications of multiple individual passengers, but these communications cannot be individually identified by the ground-based access network. The management of this wide bandwidth connection to enable the individual identification of passengers via the assignment of individual unique IP addresses to each passenger wireless device has yet to be addressed in existing wireless networks.

BRIEF SUMMARY OF THE INVENTION

The above-described problems are solved and a technical advance achieved in the field by the present System For Creating An Aircraft-Based Internet Protocol Subnet In An Airborne Wireless Cellular Network (termed "Aircraft IP Subnet System" herein), which enables the assignment of individual Internet Protocol (IP) addresses to each of the passengers' wireless devices, operating in an aircraft and served by an airborne wireless cellular network, thereby to enable delivery of wireless services to the individually identified wireless devices.

The Aircraft IP Subnet System provides wireless communication services to passengers who are located onboard an aircraft by storing data indicative of the individually identified wireless devices that are located onboard the aircraft. The Aircraft IP Subnet System assigns a single IP address to each Point-to-Point Protocol radio frequency link which connects the aircraft network to the ground-based access network, but also creates an IP subnet onboard the aircraft. The IP subnet utilizes a plurality of IP addresses for each of the Point-to-Point radio frequency links thereby to enable each passenger's wireless device to be uniquely identified with their own IP address. This is enabled since both Point-to-Point Protocol IPCP endpoints have pre-defined IP address pools and/or topology configured, so each Point-to-Point Protocol endpoint can utilize a greater number of IP addresses than one per link. Such an approach does not change IPCP or other EVDO protocols/messaging but does allow the wireless device individual IP address to be directly visible to the ground-based access network.

The electronic services that are provided to the passenger include Internet, in-flight entertainment services, such as multi-media presentations, as well as destination-based services, which link the passenger's existing travel plans with offers for additional services that are available to the passenger at their nominal destination and their planned travel schedule, and optionally, voice services. The passenger thereby is presented with opportunities during their flight to enhance their travel experience, both in-flight and at their destination, by accessing the various services. The individual identification of each passenger's wireless device simplifies the provision of these services and enables the customization of these services based upon predefined profiles created for each passenger.

This provision of the Aircraft IP Subnet System is accomplished in part by the use of an "Inner Network" that connects the two segments of the "Outer Network", comprising the Air Subsystem and the ground-based access network. The Inner Network transmits both the subscriber traffic (comprising voice and/or other data) and feature set data between the Air Subsystem and the ground-based access network thereby to enable the passengers' wireless devices that are located in the aircraft to receive consistent wireless communication services in both the terrestrial ground-based) and non-terrestrial regions.

BRIEF DESCRIPTION OF THE DRAWINGS

FIG. 8A illustrates, in block diagram form, the architecture of the Aircraft IP Subnet System for multiple aircraft, while

DETAILED DESCRIPTION OF THE INVENTION

Overall System Architecture

Figure 1:
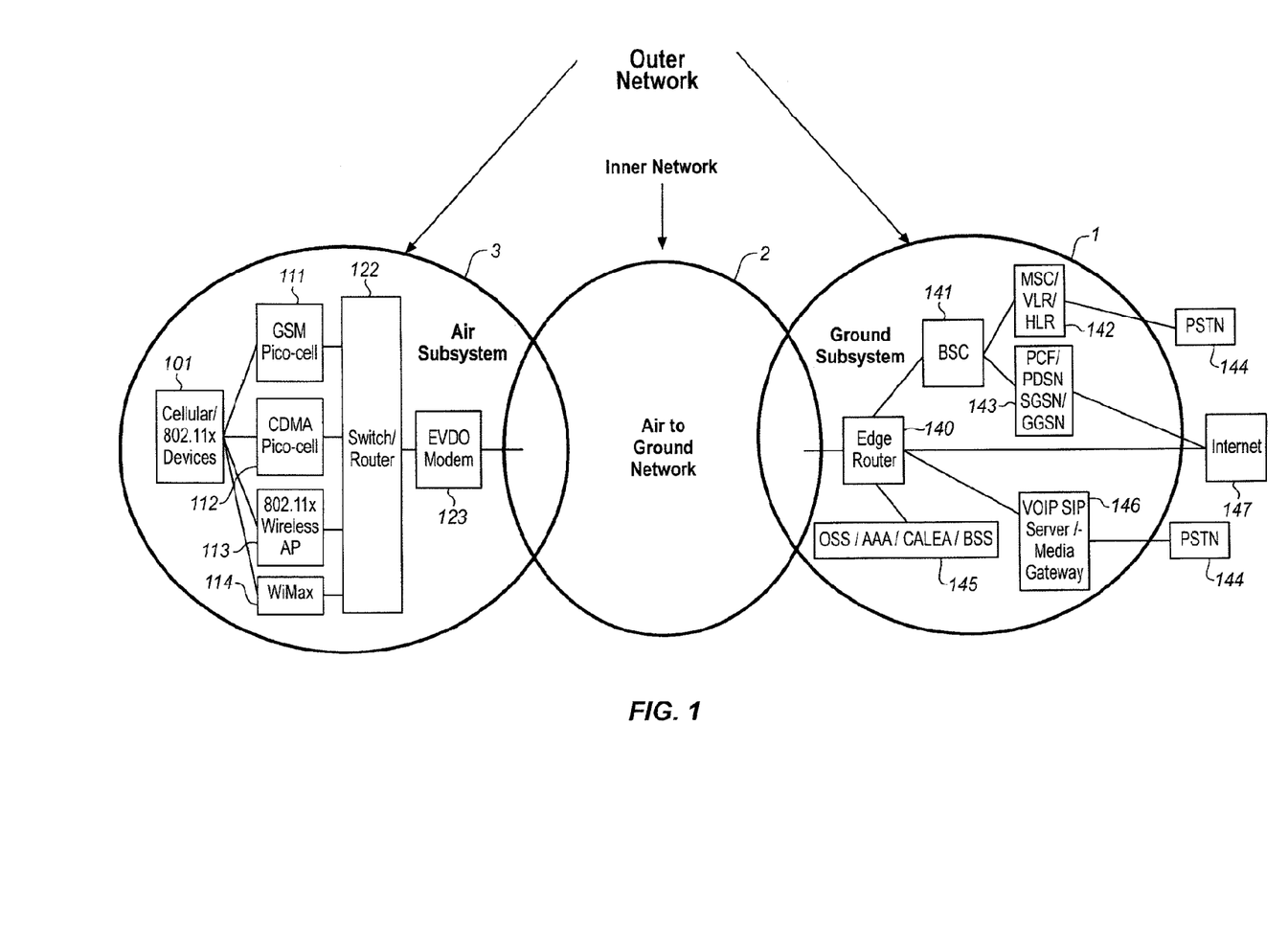
FIG. 1 illustrates, in block diagram form, the overall architecture of a composite air-to-ground network that interconnects an Air Subsystem with a Ground-Based Access Network.

FIG. 1 illustrates, in block diagram form, the overall architecture of the non-terrestrial cellular communication network, which includes an Air-To-Ground Network 2 (Inner Network) that interconnects the two elements of an Outer Network, comprising an Air Subsystem 3 and Ground Subsystem 1. This diagram illustrates the basic concepts of the non-terrestrial cellular communication network and, for the purpose of simplicity of illustration, does not comprise all of the elements found in a typical non-terrestrial cellular communication network. The fundamental elements disclosed in FIG. 1 provide a teaching of the interrelationship of the various elements which are used to implement a non-terrestrial cellular communication network to provide content to passengers' wireless devices which are located in an aircraft.

The overall concept illustrated in FIG. 1 is the provision of an "Inner Network" that connects the two segments of the "Outer Network", comprising the Air Subsystem 3 and the Ground Subsystem 1. This is accomplished by the Air-To-Ground Network 2 transmitting both the passenger communication traffic (comprising voice and/or other data) and control information and feature set data between the Air Subsystem 3 and the Ground Subsystem 1 thereby to enable the passengers' wireless devices that are located in the aircraft to receive services in the aircraft.

Air Subsystem

The "Air Subsystem" is the communications environment that is implemented in the aircraft, and these communications can be based on various technologies, including but not limited to: wired, wireless, optical, acoustic (ultrasonic), and the like. An example of such a network is disclosed in U.S. Pat. No. 6,788,935, titled "Aircraft-Based Network For Wireless Subscriber Stations".

The preferred embodiment for the Air Subsystem 3 is the use of wireless technology and for the wireless technology to be native to the passengers' wireless devices that passengers and crew carry on the aircraft. Thus, a laptop computer can communicate via a WiFi or WiMax wireless mode (or via a wired connection, such as a LAN), or a PDA could communicate telephony voice traffic via VoIP (Voice over IP). Likewise, a handheld cell phone that uses the GSM protocol communicates via GSM when inside the aircraft to the Air Subsystem. A CDMA cell phone would use CDMA and an analog AMPS phone would use analog AMPS when inside the aircraft to the Air Subsystem 3. The connection states could be packet-switched or circuit-switched or both. Overall, the objective on the Air Subsystem 3 is to enable seamless and ubiquitous access to the Air Subsystem 3 for the passengers' wireless devices that are carried by passengers and crew, regardless of the technology used by these wireless devices.

The Air Subsystem 3 also provides the mechanism to manage the provision of services to the passengers' wireless devices that are operating in the aircraft cabin. This management includes not only providing the passenger traffic connectivity but also the availability of non-terrestrial specific feature sets which each passenger is authorized to receive. These features include in-flight entertainment services, such as multi-media presentations, as well as destination-based services which link the passenger's existing travel plans with offers for additional services that are available to the passenger at their nominal destination and their planned travel schedule. The passenger thereby is presented with opportunities during their flight to enhance their travel experience, both in-flight and at their destination.

The passengers' wireless devices 101 used in the aircraft can be identical to those used on the cellular/PCS ground-based communication network; however, these passengers' wireless devices 101 are pre-registered with the carrier serving the aircraft and/or users have PIN numbers for authentication. In addition, an antenna interconnects the passengers' wireless devices 101 with the in-cabin Base Transceiver Stations (BTS) 111-114, which are typically pico-cells with BSC/MSC functions integrated. BTS/BSC/MSC modules are added for each air-interface technology supported. The Switch/Router 122 acts as the bridging function (for media/content and signaling to a limited extent) between the Air Subsystem 3 and the ground-based access network 1, since the Switch/Router 122 places a call using the Modem 123 to the ground-based access network 1 via the Air-To-Ground Network 2. Data Concentrator 821 and Air-to-Ground Radio Equipment 822 of this system serve to replace the previously described one-one paired channelization interface between the In-Cabin Network 3 and Air-to-Ground Network 2 having an aggregated wireless link to/from the aircraft. This equipment converts the individual traffic and signaling channels from the base stations to/from an aggregate data stream, and transmits/receives the aggregate data streams over the Air-to-Ground Network 2 which maintains continuous service as the aircraft travels. The Air-Ground Radio Equipment 822 includes radio transmission equipment and antenna systems to communicate with ground-based transceivers in the ground-based portion of the Air-to-Ground Network 2. The individual traffic channels assigned on the Air-to-Ground Network 2 are activated based upon the traffic demand to be supported from the aircraft.

Air-to-Ground Network

The Air-to-Ground Network 2 shown in FIG. 1 is clearly one that is based on wireless communications (radio frequency or optical) between the Ground Subsystem 1 and the passengers' wireless devices that are located in the aircraft, with the preferred approach being that of a radio frequency connection. This radio frequency connection takes on the form of a cellular topology where typically more than one cell describes the geographic footprint or coverage area of the composite Air-To-Ground Network 2. The air-to ground connection carries both passenger communications traffic and native network signaling traffic. In the preferred embodiment, the Air-to-Ground Network 2 transports all traffic to/from the aircraft in a single, aggregated communication channel. This "single pipe" has distinct advantages in terms of managing hard and soft handoffs as the aircraft transitions between one ground-based cell to the next. This approach also takes advantage of newer, higher speed wireless cellular technologies.

Alternatively, the Air-To-Ground Network 2 could be achieved through a wireless satellite connection where radio frequency links are established between the aircraft and a satellite and between the satellite and the Ground Subsystem 1, respectively. These satellites could be geosynchronous (appears to be stationary from an earth reference point) or moving, as is the case for Medium Earth Orbit (MEO) and Low Earth Orbit (LEO). Examples of satellites include, but are not limited to: Geosynchronous Ku Band satellites, DBS satellites (Direct Broadcast Satellite), the Iridium system, the Globalstar system, and the Inmarsat system. In the case of specialized satellites, such as those used for Direct Broadcast Satellite, the link typically is unidirectional, that is, from the satellite to the receiving platform, in this case an aircraft. In such a system, a link transmitting unidirectionally from the aircraft is needed to make the communication bidirectional. This link could be satellite or ground-based wireless in nature as previously described. Last, other means for communicating to aircraft include broad or wide area links such as HF (High Frequency) radio and more unique systems such as troposcatter architectures.

The Air-To-Ground Network 2 can be viewed as the conduit through which the passenger communications traffic as well as the control and network feature set data is transported between the Ground Subsystem 1 and the Air Subsystem 3. The Air-To-Ground Network 2 can be implemented as a single radio frequency link or multiple radio frequency links, with a portion of the signals being routed over different types of links, such as the Air-To-Ground Link and the Satellite Link. Thus, there is a significant amount of flexibility in the implementation of this system, using the various components and architectural concepts disclosed herein in various combinations.

Ground Subsystem

The Ground Subsystem 1 consists of Edge Router 140 which connects the voice traffic of the Air-To-Ground Network 2 with traditional cellular communication network elements, including a Base Station Controller 141 and its associated Mobile Switching Center 142 with its Visited Location Register, Home Location Register to interconnect the voice traffic to the Public Switched Telephone Network 144, and other such functionalities. In addition, the Base Station Controller 141 is connected to the Internet 147 via Public Switched Data Network 143 for call completions. Edge Router 124 also provides interconnection of the data traffic to the Internet 147, Public Switched Telephone Network 144 via Voice Over IP Server 146, and other such functionalities. These include the Authentication Server, Operating Subsystems, CALEA, and BSS servers 145.

Thus, the communications between the passengers' wireless devices 101 located in an aircraft and the Ground Subsystem 1 of the ground-based communication network are transported via the Air Subsystem 3 and the Air-To-Ground Network 2 to the ground-based Base Station Controllers 141 of the non-terrestrial cellular communication network. The enhanced functionality described below and provided by the Air Subsystem 3, the Air-To-Ground Network 2, and the ground-based Base Station Controllers 141 renders the provision of services to the passengers' wireless devices 101 located in an aircraft transparent to the passengers. The Radio Access Network (RAN) supports communications from multiple aircraft and may employ a single omni-directional signal, or may employ multiple spatial sectors which may be defined in terms of azimuth and/or elevation angles. Aircraft networks hand over the Point-to-Point communication links between Radio Access Networks RAN) in different locations (different Ground Subsystems 1) in order to maintain continuity of service on Air-to-Ground Network 2. Handovers may be hard or soft, or may be a combination of hard and soft on the air-ground and ground-air links.

The Mobile Switching Center (MSC) provides mobility management for all airborne systems and provides handover management between ground stations as an airborne system moves between the service areas of adjoining Ground Subsystems 1. The Base Station Controller (BSC) interfaces all traffic to/from the Base Transceiver Subsystem (BTS). The Packet Data Serving Node (PDSN) controls assignment of capacity of each of the Base Transceiver Subsystems (BTS) amongst the airborne systems within their respective service areas.

Typical Aircraft-Based Network

Figure 2:
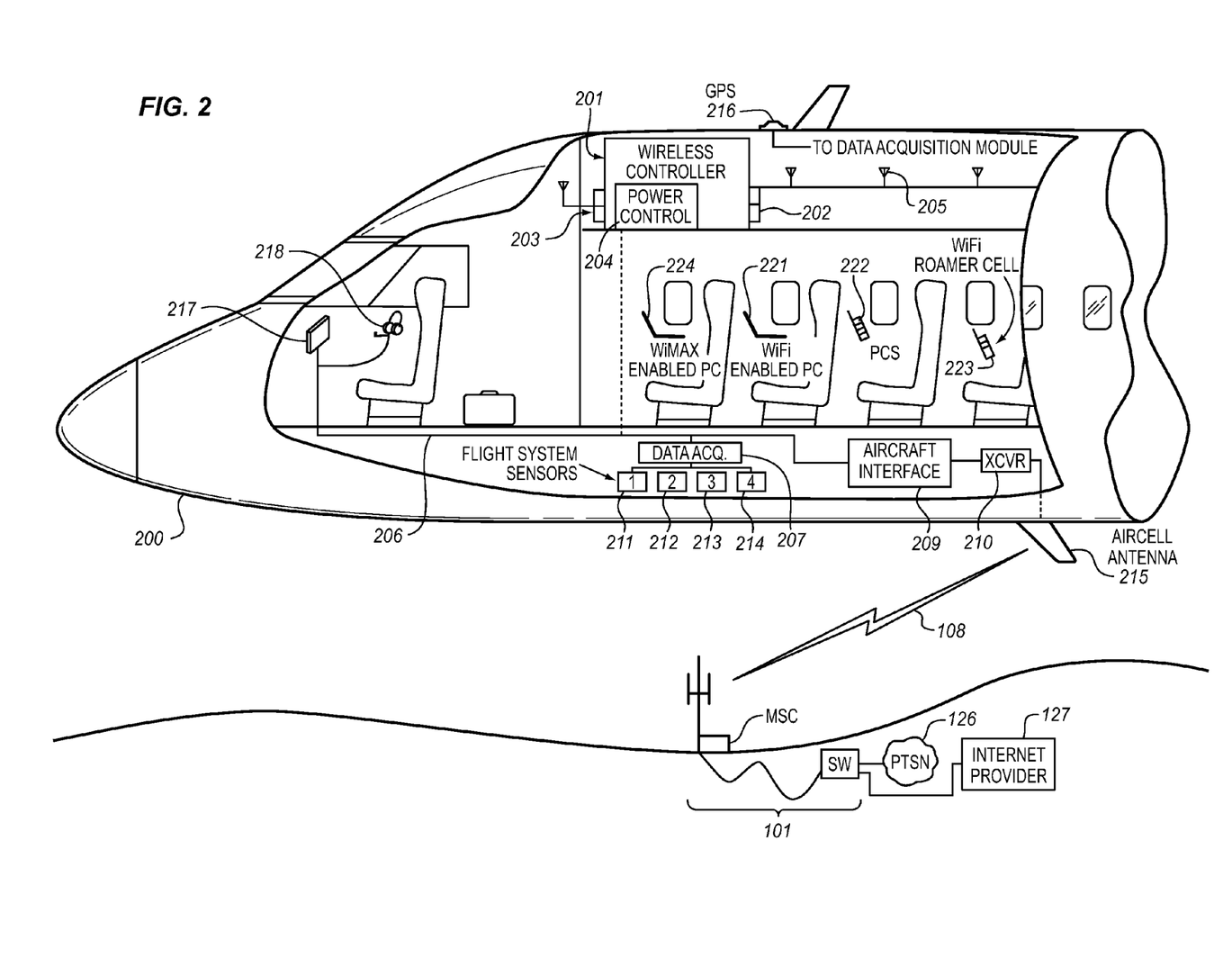
FIG. 2 illustrates, in block diagram form, the architecture of a typical embodiment of a typical aircraft-based network for wireless devices as embodied in a multi-passenger commercial aircraft.

FIG. 2 illustrates the architecture of a typical aircraft-based network for passengers' wireless devices as embodied in a multi-passenger commercial aircraft 200. This system comprises a plurality of elements used to implement a communication backbone that is used to enable wireless communication for a plurality of wireless communication devices of diverse nature. The aircraft-based network for passengers' wireless devices comprises a Local Area Network 206 that includes a radio frequency communication system 201 that uses a spread spectrum paradigm and has a short range of operation. This network 206 supports both circuit-switched and packet-switched connections from passengers' wireless devices 221-224 and interconnects the communications of these passengers' wireless devices 221-224 via a gateway transceiver or transceivers 210 to the Public Switched Telephone Network (PSTN) 126 and other destinations, such as the Internet 127 or Public Data Switched Network (PDSN). The wireless passengers thereby retain their single number identity as if they were directly connected to the Public Switched Telephone Network 126. The passengers' wireless devices 221-224 include a diversity of communication devices, such as laptop computers 221, cellular telephones 222, MP3 music players (not shown), Personal Digital Assistants (PDAs) (not shown), WiFi-based devices 223, WiMax-based devices 224, and the like, and for simplicity of description are all collectively termed "passengers' wireless devices" herein, regardless of their implementation-specific details.

The basic elements of the aircraft-based network for passengers' wireless devices comprises at least one antenna 205 or means of coupling electromagnetic energy to/from the Air Subsystem 3 located within the aircraft 200 which serves to communicate with the plurality of passengers' wireless devices 221-224 located within the aircraft 200. The at least one antenna 205 is connected to a wireless controller 201 that encompasses a plurality of elements that serve to regulate the wireless communications with the plurality of passengers' wireless devices 221-224. The wireless controller 201 includes at least one low power radio frequency transceiver 202 for providing a circuit switched communication space using a wireless communication paradigm, such as PCS, CDMA, or GSM, for example. In addition, the wireless controller 201 includes a low power radio frequency transceiver 203 for providing a data-based packet switched communication space using a wireless communication paradigm, such as WiFi (which could also convey packet switched Voice over Internet Protocol (VoIP)).

Finally, the wireless controller 201 includes a power control segment 204 that serves to regulate the power output of the plurality of passengers' wireless devices. It also serves to, by RF noise or jamming apparatus, prevent In-Cabin passengers' wireless devices from directly and errantly accessing the ground network when in a non-terrestrial mode. The ultra-low airborne transmit power levels feature represents a control by the Power Control element 204 of the wireless controller 201 of the aircraft-based network for passengers' wireless devices to regulate the output signal power produced by the passengers' wireless devices 221-224 to minimize the likelihood of receipt of a cellular signal by ground-based cell sites or ground-based passengers' wireless devices.

It is obvious that these above-noted segments of the wireless controller 201 can be combined or parsed in various ways to produce an implementation that differs from that disclosed herein. The particular implementation described is selected for the purpose of illustrating the concept of the invention and is not intended to limit the applicability of this concept to other implementations.

The wireless controller 201 is connected via a backbone network 206 to a plurality of other elements which serve to provide services to the passengers' wireless devices 221-224. These other elements can include an Aircraft Interface 209 for providing management, switching, routing, and aggregation functions for the communication transmissions of the passengers' wireless devices. A data acquisition element 207 serves to interface with a plurality of flight system sensors 211-214 and a Global Positioning System element 216 to collect data from a plurality of sources as described below. Furthermore, pilot communication devices, such as the display 217 and headset 218, are connected to this backbone network 206 either via a wired connection or a wireless connection.

Finally, a gateway transceiver(s) 210 is used to interconnect the Aircraft Interface 209 to an antenna 215 to enable signals to be transmitted from the aircraft-based network for passengers' wireless devices to transceivers located on the ground. Included in these components is a communications router function to forward the communication signals to the proper destinations. Thus, signals that are destined for passengers on the aircraft are routed to these individuals, while signals routed to passengers located, for example, on the ground are routed to the Ground Subsystem. Aircraft antenna patterns that typically minimize nadir (Earth directed) effective radiated power (ERP) may be used in the implementation of the antenna(s) 215 on the aircraft to serve the aircraft-based network for passengers' wireless devices.

Passenger Login for System Access

On each aircraft, the passenger access to electronic communications typically is regulated via a passenger's wireless device registration process, where each electronic device must be identified, authenticated, and authorized to receive service. Since the aircraft is a self-contained environment with respect to the wireless communications between the passengers' wireless devices and the airborne wireless network extant in the aircraft, all communications are regulated by the network controller. Thus, when a passenger activates their wireless device, a communication session is initiated between the passenger's wireless device and the network controller to identify the type of device the passenger is using and, thus, its wireless protocol. A "splash screen" is delivered to the passenger on their wireless device to announce entry into the wireless network portal. Once this is established, the network controller transmits a set of login displays to the passenger's wireless device to enable the passenger to identify themselves and validate their identity (if the passenger's wireless device is not equipped to automatically perform these tasks via a smart card which automatically logs the passenger into the network). As a result of this process, the passenger's wireless device is provided with a unique electronic identification (IP address), and the network can respond to the passenger's wireless device without further administrative overhead. The authentication process may include the use of security processes, such as a password, scan of a passenger immutable characteristic (fingerprint, retina scan, etc.), and the like.

Once the passenger's wireless device is logged in, the passenger can access the free standard electronic services that are available from the network or customized electronic services for the particular passenger. The screens that are presented to the passengers can be customized to present the branding of the airline on which the passenger is traveling.

Mobile Wireless Network Architecture

Figure 3A:
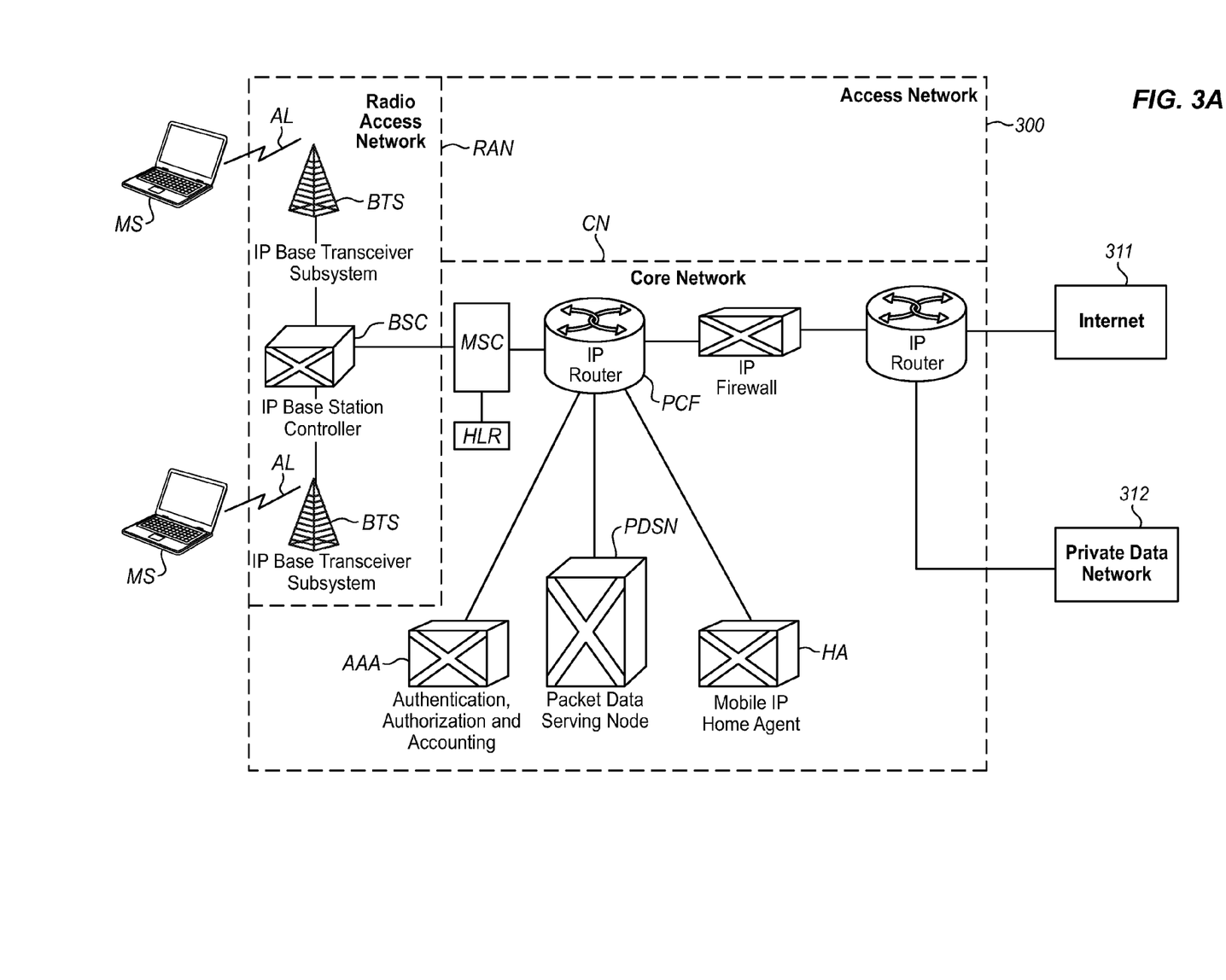
FIGS. 3A and 3B illustrate, in block diagram form, the architecture of a typical EVDO cellular network for IP data only service and for IP data and voice services, respectively.
Figure 3B:
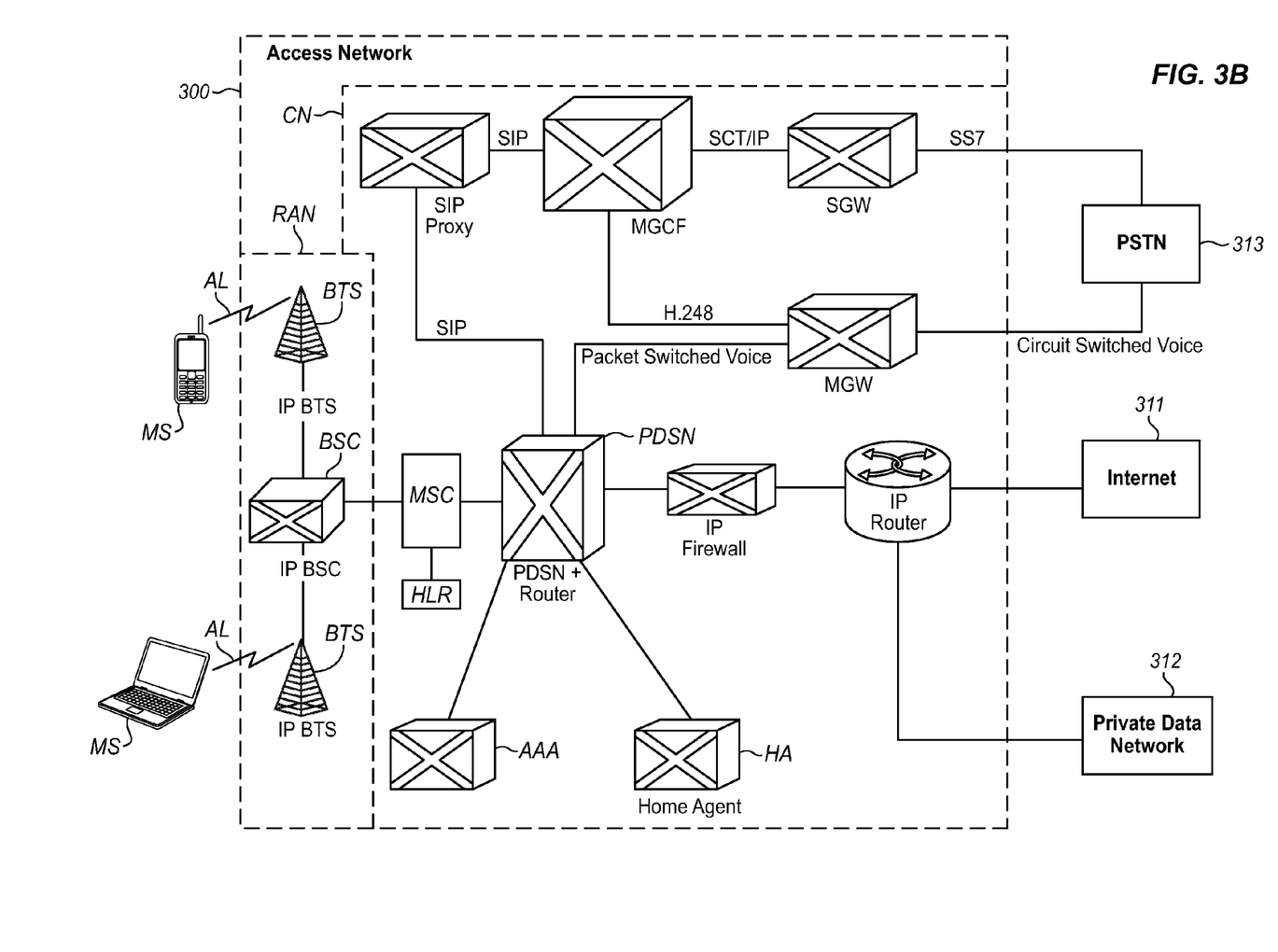

For simplicity of description, the following example is based upon the use of a CDMA2000 EVDO cellular network paradigm. However, the concepts illustrated herein are not limited to this implementation, and it is expected that other implementations can be created based upon other network architectures and implementations. Therefore, FIGS. 3A and 3B illustrate, in block diagram form, the architecture of a typical EVDO cellular network for IP data only service and for IP data and voice services, respectively, and which are used to illustrate the architecture and operation of the present Aircraft IP Subnet System. CDMA2000 is a hybrid 2.5G/3G technology of mobile telecommunications that uses CDMA (code division multiple access) to send digital radio, voice, data, and signaling data between wireless devices and cell sites. The architecture and operation of the CDMA2000 cellular network is standardized by the 3rd Generation Partnership Project 2 (3GPP2). In a CDMA2000 cellular network, two radio access network technologies are supported: 1×RTT and EV-DO (Evolution-Data Optimized), wherein CDMA2000 is considered a third generation (3G) technology when the EV-DO access network is used.

The CDMA 2000 cellular network (also termed "access network" herein) comprises three major parts: the core network (CN), the radio access network RAN) and the wireless device (MS). The core network (CN) is further decomposed in two parts, one interfacing to external networks such as the Public Switched Telephone Network (PSTN) and the other interfacing to an IP based networks such as the Internet 311 and/or private data networks 312. The wireless device MS terminates the radio path on the user side of the cellular network and enables subscribers to access network services over the interface Um implemented to interconnect the wireless device (MS) with the Access Network 300.

Several key components of the Access Network 300 for IP data only as illustrated in FIG. 3A are:

Base Transceiver System (BTS): an entity that provides transmission capabilities across the Um reference point. The Base Transceiver System (BTS) consists of radio devices, antenna and equipment.

Base Station Controller (BSC): an entity that provides control and management for one or more Base Transceiver Systems (BTS).

Packet Control Function (PCF): an entity that provides the interface function to the packet-switched network (Internet 311 and/or Private Data Network 312).

The wireless device (MS) functions as a mobile IP client. The wireless device (MS) interacts with the Access Network 300 to obtain appropriate radio resources for the exchange of packets, and keeps track of the status of radio resources (e.g., active, stand-by, dormant). The wireless device (MS) accepts buffer packets from the Base Transceiver System (BTS) when radio resources are not in place or are insufficient to support the flow to the Access Network 300. Upon power-up, the wireless device (MS) automatically registers with the Home Location Register (HLR) in the Mobile Switching Center (MSC) in order to:

Authenticate the wireless device (MS) for the environment of the accessed network;
Provide the Home Location Register (HLR) with the wireless device's present location; and
Provide the Serving Mobile Switching Center (MSC) with the wireless device's permitted feature set.

After successfully registering with the Home Location Register (HLR), the wireless device (MS) is ready to place voice and data calls. These may take either of two forms, Circuit-Switched Data (CSD) or Packet-Switched Data (PSD), depending on the wireless device's own compliance (or lack thereof with the IS-2000 standard.

Wireless devices must comply with IS-2000 standards to initiate a packet data session using the Access Network 300. Wireless devices which have only IS-95 capabilities are limited to Circuit-Switched Data transmitted via the Public Switched Telephone Network (PSTN), while IS-2000 terminals can select either the Packet-Switched Data or Circuit-Switched Data. Parameters forwarded by the wireless device (MS) over the air link (AL) to the Access Network 300 determine the type of service requested. For each data session, a Point-to-Point Protocol (PPP) session is created between the wireless device (MS) and the Packet Data Serving Node PDSN). IP address assignment for each wireless device can be provided by either the Packet Data Serving Node (PDSN) or a Dynamic Host Configuration Protocol (DHCP) server via a Home Agent (HA).

The Radio Access Network (RAN)

The Radio Access Network (RAN) is the wireless device's entry point for communicating either data or voice content. It consists of:

The air link (AL);
The cell site tower/antenna and the cable connection to the Base Transceiver;
Subsystem (BTS);
The Base Transceiver Subsystem (BTS);
The communications path from the Base Transceiver Subsystem to the Base;
Station Controller (BSC);
The Base Station Controller (BSC); and
The Packet Control Function (PCF).

The Radio Access Network (RAN) has a number of responsibilities that impact the network's delivery of packet services in particular. The Radio Access Network (RAN) must map the mobile client identifier reference to a unique link layer identifier used to communicate with the Packet Data Serving Node (PDSN), validate the wireless device for access service, and maintain the established transmission links.

The Base Transceiver Subsystem (BTS) controls the activities of the air link (AL) and acts as the interface between the Access Network 300 and the wireless device (MS). Radio Frequency resources such as frequency assignments, sector separation, and transmit power control are managed at the Base Transceiver Subsystem (BTS). In addition, the Base Transceiver Subsystem (BTS) manages the back-haul from the cell site to the Base Station Controller (BSC) to minimize any delays between these two elements.

The Base Station Controller (BSC) routes voice- and circuit-switched data messages between the cell sites and the Mobile Switching Center (MSC). It also bears responsibility for mobility management: it controls and directs handoffs from one cell site to another as needed.

The Packet Control Function (PCF) routes IP packet data between the mobile station (MS) within the cell sites and the Packet Data Serving Node PDSN). During packet data sessions, it assigns available supplemental channels as needed to comply with the services requested by the wireless device (MS) and paid for by the subscribers.

Packet Data Serving Node (PDSN)

The Packet Data Serving Node (PDSN) is the gateway from the Radio Access Network (RAN) into the public and/or private packet networks. In a simple IP network, the Packet Data Serving Node (PDSN) acts as a standalone Network Access Server (NAS), while in a mobile IP network it can be configured as a Home Agent (HA) or a Foreign Agent (FA). The Packet Data Serving Node (PDSN) implements the following activities:

Manage the radio-packet interface between the Base Station Subsystem (BTS), the Base Station Controller (BSC), and the IP network by establishing, maintaining, and terminating link layer to the mobile client;
Terminate the Point-to-Point Protocol (PPP) session initiated by the subscriber;
Provide an IP address for the subscriber (either from an internal pool or through a Dynamic Host Configuration Protocol (DHCP) server or through an Authentication, Authorization, and Accounting (AAA) server);
Perform packet routing to external packet data networks or packet routing to the Home Agent (HA) which optionally can be via secure tunnels;
Collect and forward packet billing data;
Actively manage subscriber services based on the profile information received from the SCS server of the Authentication, Authorization, and Accounting (AAA) server; and
Authenticate users locally, or forward authentication requests to the Authentication, Authorization, and Accounting (AAA) server.

Authentication, Authorization, and Accounting Server

The Authentication, Authorization, and Accounting (AAA) server is used to authenticate and authorize subscribers for network access and to store subscriber usage statistics for billing and invoicing.

The Home Agent

The Home Agent (HA) supports seamless data roaming into other networks that support 1×RTT. The Home Agent (HA) provides an anchor IP address for the mobile and forwards any mobile-bound traffic to the appropriate network for delivery to the handset. It also maintains user registration, redirects packets to the Packet Data Serving Node PDSN), and (optionally) tunnels securely to the Packet Data Serving Node PDSN). Lastly, the Home Agent (HA) supports dynamic assignment of users from the Authentication, Authorization, and Accounting (AAA) server and (again optionally) assigns dynamic home addresses.

Traditional Single Call Setup in a CDMA2000 Access Network

A successful call set-up scenario for a single wireless device to establish a communication connection in a CDMA2000 access network is described below. Note that this explanation bypasses the radio reception/transmission activities of the Base Transceiver Subsystem (BTS), concentrating instead on the protocol functions that begin with the Origination dialogue between the wireless device (MS) and the Base Station Controller (BSC):

1. To register for packet data services, the wireless device (MS) sends an Origination Message over the Access Channel to the Base Station Subsystem (BSS).
2. The Base Station Subsystem (BSS) acknowledges the receipt of the Origination Message, returning a Base Station Ack Order to the wireless device (MS).
3. The Base Station Subsystem (BSS) constructs a CM Service Request message and sends the message to the Mobile Switching Center (MSC).
4. The Mobile Switching Center sends an Assignment Request message to the Base Station Subsystem (BSS) requesting assignment of radio resources. No terrestrial circuit between the Mobile Switching Center (MSC) and the Base Station Subsystem (BSS) is assigned to the packet data call.
5. The Base Station Subsystem (BSS) and the wireless device (MS) perform radio resource set-up procedures. The Packet Control Function (PCF) recognizes that no A10 connection associated with this wireless device (MS) is available and selects a Packet Data Serving Node (PDSN) for this data call. The A10 connection is a term defined by the standards bodies and refers to an Interface between Base Station Controller (BSC) and the Packet Data Serving Node PDSN), where A10 references IP user data exchanged between the Base Station Controller (BSC) and the Packet Data Serving Node PDSN).
6. The Packet Control Function (PCF) sends an A11-Registration Request message to the selected Packet Data Serving Node (PDSN).
7. The A11-Registration Request is validated and the Packet Data Serving Node PDSN) accepts the connection by returning an A11-Registration Reply message. Both the Packet Data Serving Node (PDSN) and the Packet Control Function (PCF) create a binding record for the A10 connection. The term A11 references signaling exchanged between the between Base Station Controller (BSC) and the Packet Data Serving Node PDSN).
8. After both the radio link and the A10 connection are set-up, the Base Station Subsystem (BSS) sends an Assignment Complete message to the Mobile Switching Center (MSC).
9. The mobile and the Packet Data Serving Node (PDSN) establish the link layer (PPP) connection and then perform the MIP registration procedures over the link layer (PPP) connection.
10. After completion of MIP registration, the mobile can send/receive data via GRE framing over the A10 connection.
11. The Packet Control Function (PCF) periodically sends an A11-Registration Request message for refreshing registration for the A10 connection.
12. For a validated A11-Registration Request, the Packet Data Serving Node (PDSN) returns an A11-Registration Reply message. Both the Packet Data Serving Node (PDSN) and the Packet Control Function (PCF) update the A10 connection binding record.

For a circuit switched voice call, the additional elements shown in FIG. 3B are required. In particular, the packet-switched voice received from the wireless device (MS) is forwarded from the Packet Data Serving Node (PDSN) to the Media Gateway MGW) where it is converted to circuit-switched voice and delivered to the Public Switched Telephone Network (PTSN). In addition, call setup data is exchanged with the Session Initiated protocol Proxy Server (SIP) to provide a signaling and call setup protocol for IP-based communications that can support a superset of the call processing functions and features present in the Public Switched Telephone Network (PSTN). The Media Gateway Control Function (MGCF) and the Signaling Gateway (SGW) implement the call processing features present in Signaling System 7 (SS7).

Figure 4:
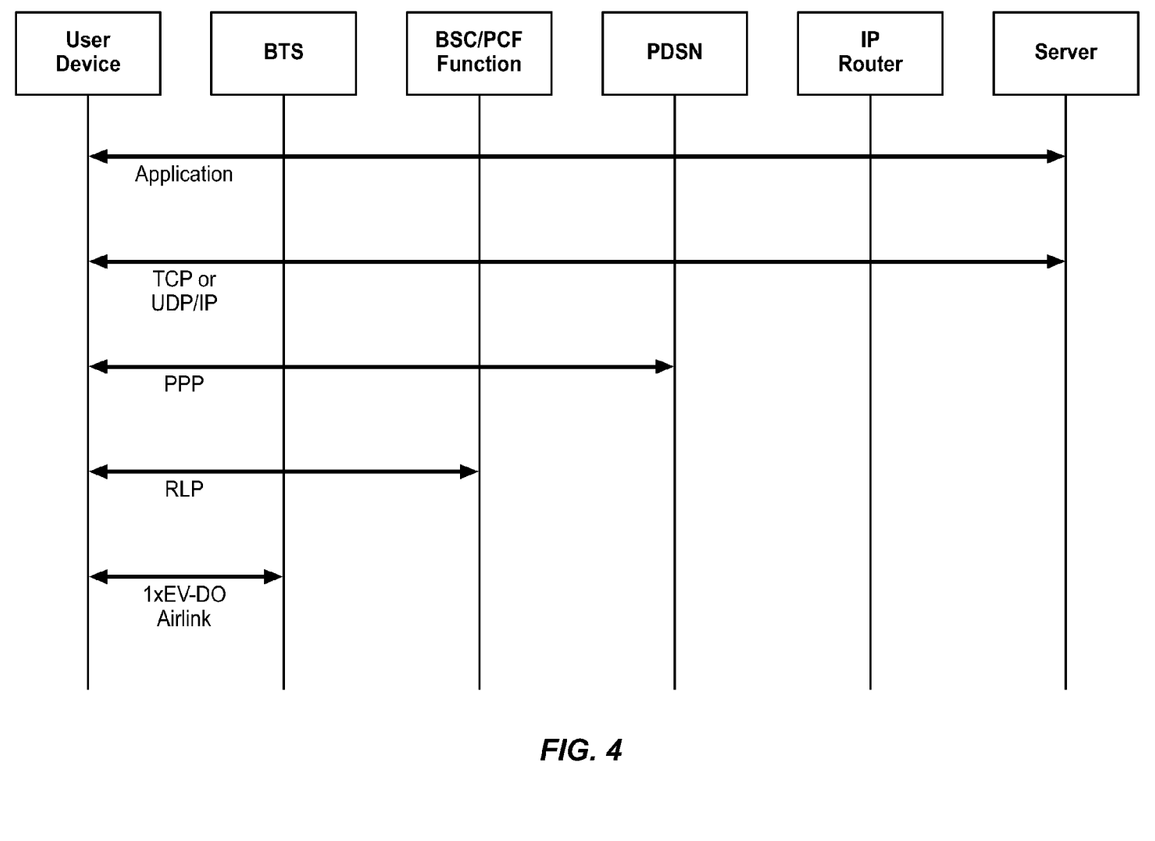
FIG. 4 illustrates the typical EVDO network session protocol stack.

FIG. 4 illustrates the typical EVDO network session protocol stack. The various layers in the existing protocol are terminated on different endpoints. Thus, the application layer, as well as the TCP (or UDP/IP) signaling protocol, manages communications between the wireless device (MS) and the server which is executing the application software that the wireless device (MS) has accessed. The Point-to-Point Protocol (PPP) extends from the wireless device (MS) which is one end point, and the Packet Data Serving Node (PDSN) as is described below. As noted above, the air link (AL) extends from the wireless device (MS) to the Base Transceiver Subsystem (BTS), while the Radio Link Protocol (RLP) extends from the wireless device (MS) to the Base Station Controller (BSC) to detect packet losses and perform retransmissions in response to transmission errors.

As can be seen from the above description, this Access Network 300 is wireless device-centric, in that it is predicated on each wireless device establishing an individual Air Link (AL) radio frequency connection with the local Base Transceiver Subsystem (BTS). There is nothing in this architecture that specifically addresses the instance where a plurality of wireless devices are served by a broadband communication link from some location (aircraft, ship, train, etc.), with the broadband link being terminated at the edge of the Access Network 300. The difficulty with the use of the broadband link is that the Packet Data Serving Node (PDSN) assigns a single IP address to the broadband link as part of the Point-to-Point Protocol (PPP), and the wireless devices that exist at the distal end of the broadband link are not identified to the Packet Data Serving Node PDSN) and, therefore, do not receive individual services.

Individual IP Addresses for Wireless Devices Onboard an Aircraft

Figure 5:
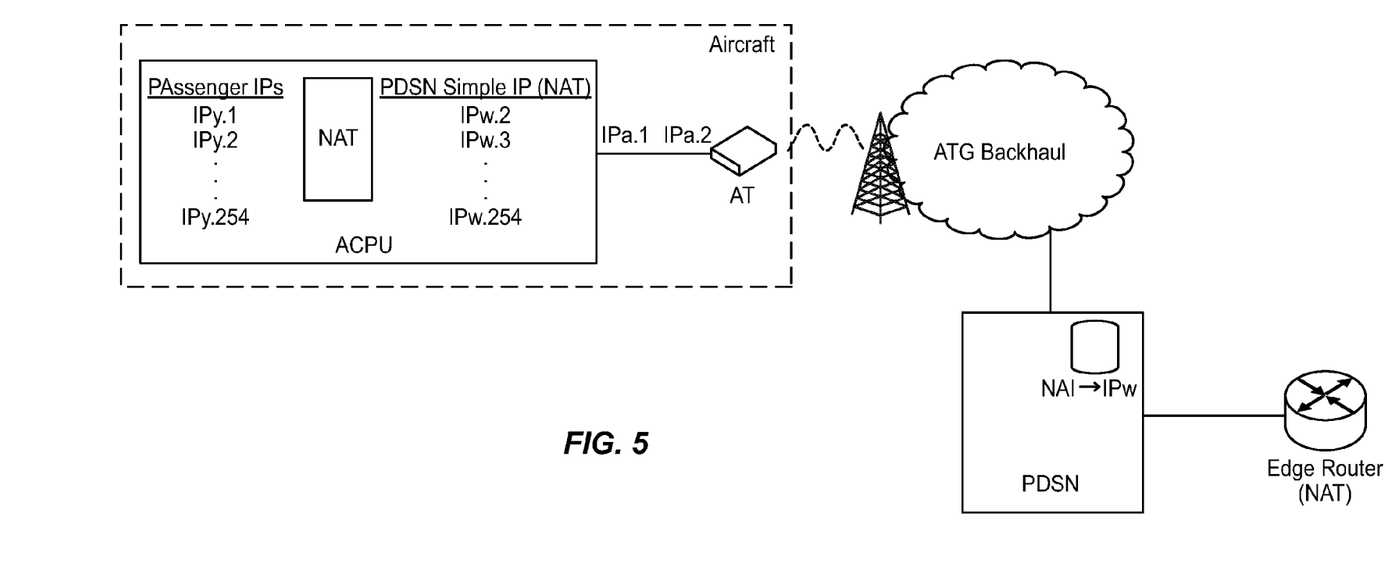
FIG. 5 illustrates, in block diagram form, the architecture of the Aircraft IP Subnet System.
Figure 6:
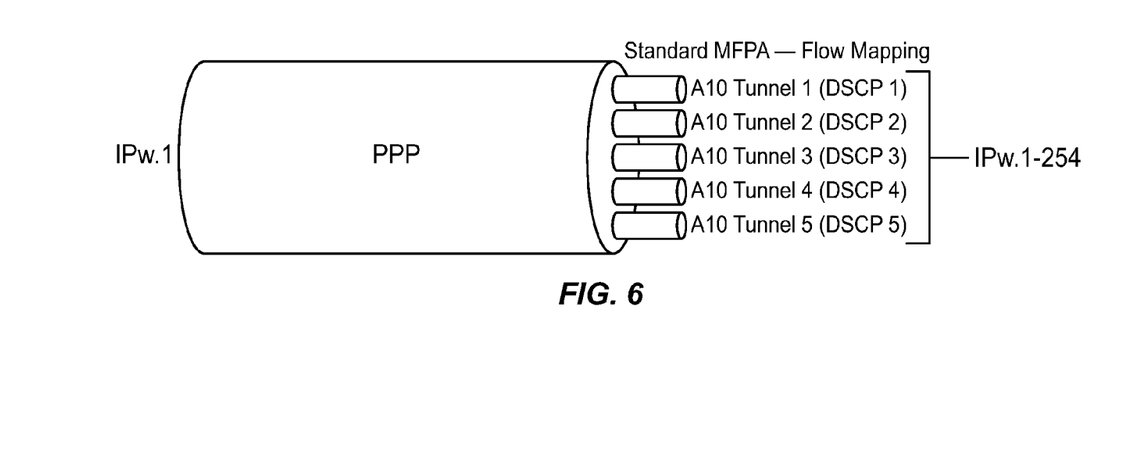
FIG. 6 illustrates the assignment of connections on a single Air-to-Ground link.
Figure 7:
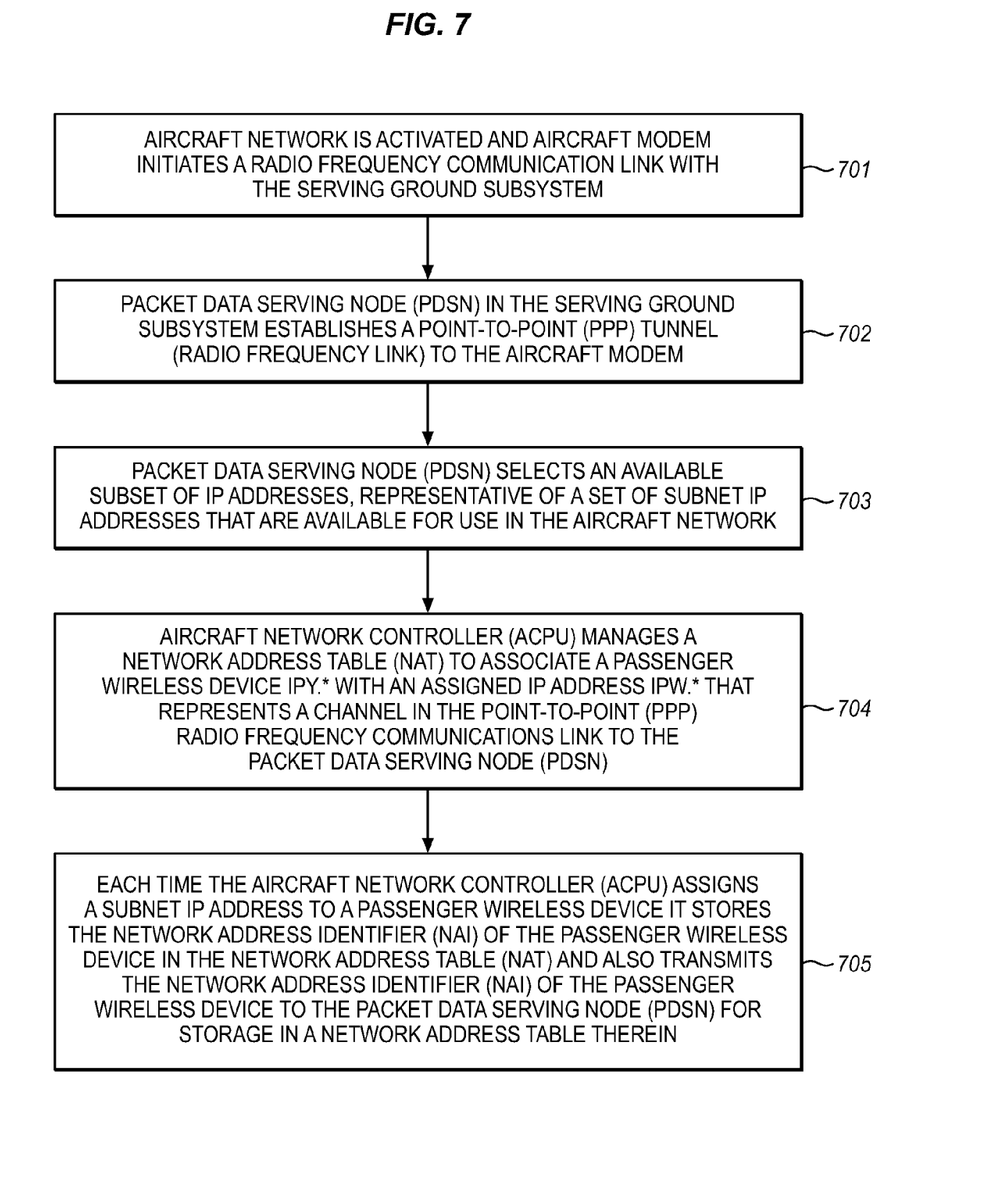
FIG. 7 illustrates, in flow diagram form, the typical operation of the Aircraft IP Subnet System.

FIG. 5 illustrates, in block diagram form, the architecture of the Aircraft IP Subnet System, while FIG. 6 illustrates the assignment of connections on a single Air-to-Ground link, and FIG. 7 illustrates, in flow diagram form, the typical operation of the Aircraft IP Subnet System. The negotiations that occur in the EVDO Point-to-Point Protocol (PPP), using the Internet Protocol Control Protocol (IPCP), allows for a single IP address to be assigned to a Point-to-Point Protocol link (such as the Air-to-Ground link 108 shown on FIG. 2). However, if both the Point-to-Point Protocol (PPP) endpoints have pre-defined IP address pools and/or a multi-device topology configured, each Point-to-Point Protocol (PPP) endpoint can utilize a greater number of IP addresses than one per Air-to-Ground link 108. The Point-to-Point Protocol (PPP) is a connection-oriented protocol that is established between two communication devices (also termed "end points"), and it functions to encapsulate data packets (such as Internet packets) for transfer between the two communication devices. Point-to-Point Protocol (PPP) allows end points to set up a logical connection and transfer data between the communication end points regardless of the underlying physical connection (such as Ethernet, ATM, or ISDN).

This approach does not change the Internet Protocol Control Protocol (IPCP) or other EVDO protocols/messaging. The benefit of more IP addresses is that the airborne network can assign a unique IP address per passenger wireless device (MS) and have this address be directly visible to the ground-based access network and its associated systems. The method to assign multiple IP addresses for each Point-to-Point Protocol PPP) link is completed by having the Packet Data Serving Node (PDSN) associate the wireless device (MS) Network Address Identifier (NAI) with an existing IP Address pool (or subnet) since each wireless device (MS) has a unique Network Address Identifier (NAI). The Packet Data Serving Node PDSN) assigns the first address from that pre-defined IP address Pool to the Air-to-Ground link, and the Packet Data Serving Node PDSN) assigns the entire pool for use by the Airborne Network to assign to the wireless devices (MS) resident on the aircraft.

The operation of the Aircraft IP Subnet System is illustrated in flow diagram form in FIG. 7, as applied to FIGS. 5 and 6. At step 701, the aircraft network 501 is activated and the aircraft modem 502 initiates a radio frequency communication link with the serving Ground Subsystem 1. The Packet Data Serving Node (PDSN) in the serving Ground Subsystem 1 at step 702 establishes a Point-to-Point PPP) tunnel (radio frequency link) to the aircraft modem 502 of the aircraft network 501. At step 703, the Packet Data Serving Node (PDSN) selects an available subset of IP addresses, representative of a set of subnet IP addresses that are available for use in the aircraft network 501. These are illustrated in FIG. 5 as IPw.*, which are private, globally unique, static IP addresses. Thus, each Packet Data Serving Node (PDSN) has at least one set of subnet IP addresses, each set being reserved for an aircraft being served by the Packet Data Serving Node (PDSN). The first IP address in the set IPw.1 is assigned to the Point-to-Point (PPP) tunnel, and the remaining members of the set IPw.2-IPw.n are transmitted to the aircraft network 501 for storage therein in a table for future assignment to passenger wireless devices operational in the aircraft.

Data transmissions to a passenger wireless device onboard the aircraft are addressed with the IP subnet address (such as IPw.k) of this device on the identified aircraft. At step 704, the aircraft network controller (ACPU) manages a Network Address Table (NAT) to associate a passenger wireless device IPy.* with an assigned IP address IPw.* that represents a channel in the Point-to-Point PPP) radio frequency communications link to the Packet Data Serving Node PDSN). As shown in FIG. 6, the Point-to-Point (PPP) radio frequency communications link to the Packet Data Serving Node (PDSN) comprises a plurality of subnet tunnels A10 Tunnel 1-A10 Tunnel 5 which are related to the IP subnet addresses IPw.*. Each time the aircraft network controller (ACPU) assigns a subnet IP address to a passenger wireless device at step 705, it stores the Network Address Identifier (NAI) of the passenger wireless device in the Network Address Table (NAT) and also transmits the Network Address Identifier (NAI) of the passenger's wireless device to the Packet Data Serving Node PDSN) for storage in a Network Address Table therein. Thus, both ends of the Point-to-Point (PPP) radio frequency communications link are coordinated with the same information. This process does not require a change to Internet Protocol Control Protocol (IPCP) messaging/procedure.

The table that is created is unique per Data Center (even PDSN), which simplifies network routing. However, the aircraft would change its Subnet when it is connected to a different Data Center (or even PDSN) due to handoffs. The Packet Data Serving Node (PDSN) places IP Protocol Data Unit PDU) data bits into various flows (A10 Tunnels) within a single Point-to-Point Protocol (PPP) link based upon DSCP markings of the Forward Link IP PDU.

Figure 8A:
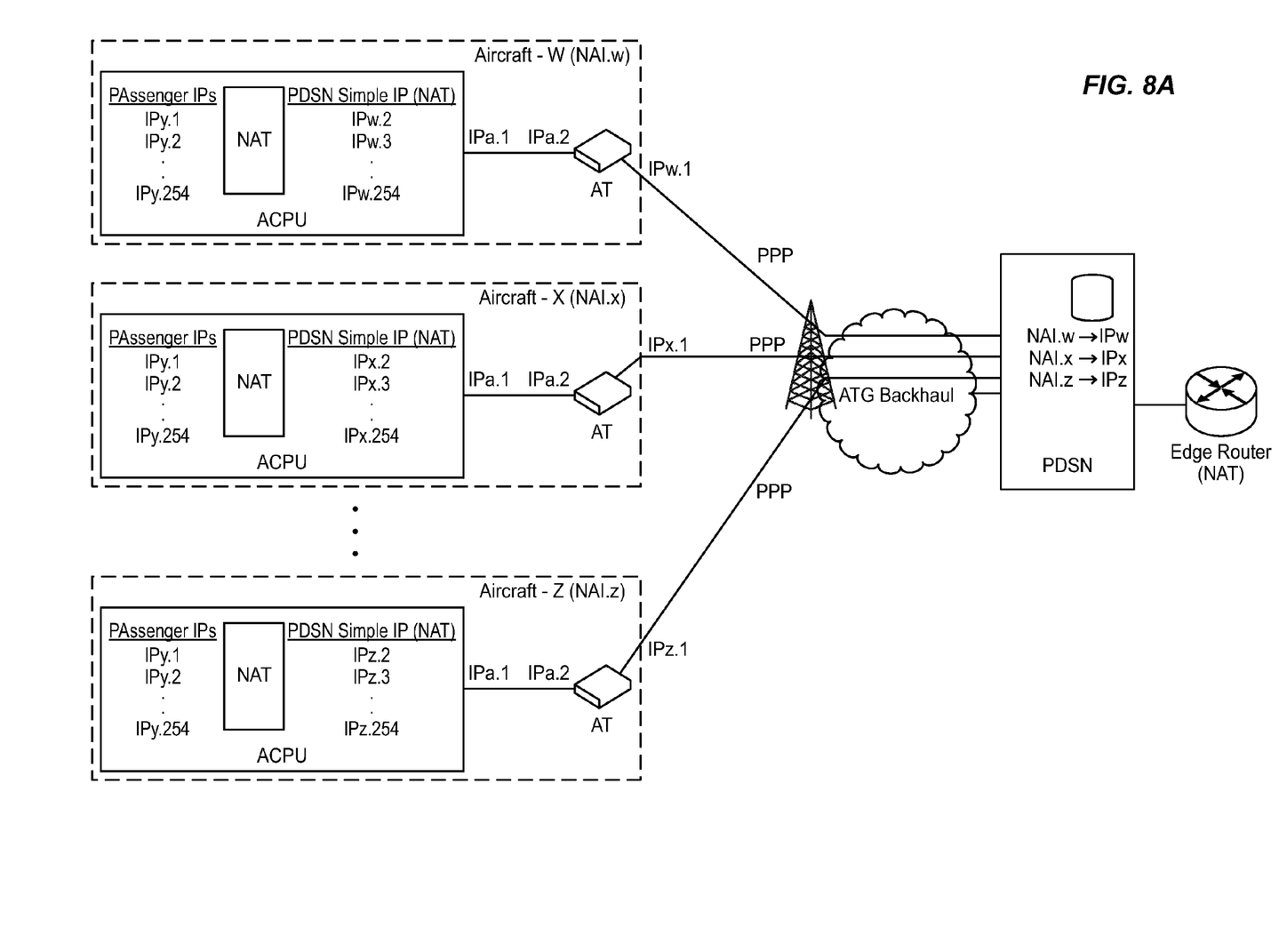
Figure 8B:
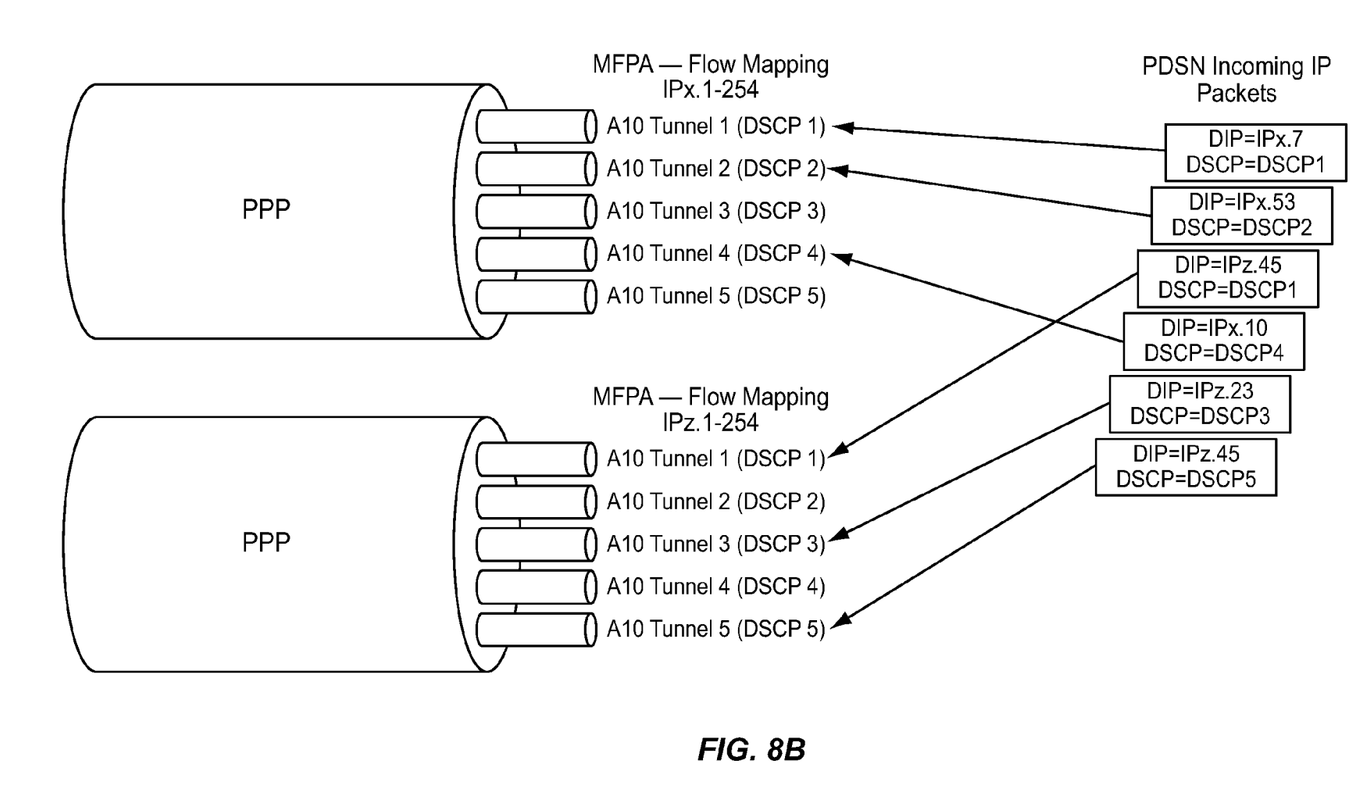
FIG. 8B illustrates the assignment of connections on multiple Air-to-Ground links.

FIG. 8A illustrates, in block diagram form, the architecture of the Aircraft IP Subnet System for multiple aircraft, while FIG. 8B illustrates the assignment of connections on multiple Air-to-Ground links. This diagram is analogous to FIGS. 5 and 6 and simply represents the example for multiple aircraft being served by the same Packet Data Serving Node (PDSN). As can be seen, each aircraft has its own unique set of subnet IP addresses: IPw.*, IPx.*, IPz.*, etc. Each Point-to-Point (PPP) radio frequency communication link manages its own tunnels, one for each passenger's wireless device extant on the associated aircraft.

SUMMARY

The Aircraft IP Subnet System enables the assignment of individual Internet Protocol (IP) addresses to each of the passengers' wireless devices, operating in an aircraft and served by an airborne wireless cellular network, thereby to enable delivery of wireless services to the individually identified wireless devices.

What is claimed as new and desired to be protected by Letters Patent of the United States is:

1. A system for providing individual ground-based access network IP addresses to a plurality of passenger wireless devices which are located onboard an aircraft, comprising:
   aircraft network means, located in an aircraft, for generating radio frequency communication signals to wirelessly communicate with a plurality of passenger wireless devices located in said aircraft, comprising:
      data concentrator means for converting the subscriber traffic and signaling channels received from said plurality of passenger wireless devices located in said aircraft to at least one aggregate data stream;
   ground-based access network means for exchanging communication signals with at least one ground-based communication network;
   air-to-ground network means for exchanging radio frequency communications between said aircraft network means and said ground-based access network means to carry said at least one aggregate data stream;
   wherein said ground-based access network means comprises:
      data disaggregator means for disaggregating said at least one aggregate data stream into a plurality of data streams and delivering each of said plurality of data streams to a corresponding ground-based communications network;
   subnet means for storing data indicative of at least one set of unique IP addresses for an associated aggregate datastream and that are available for use onboard said aircraft by each of said passenger wireless devices, comprising:
      link address assignment means, responsive to said air-to-ground network means establishing a radio frequency communication link between said aircraft network means and said ground-based access network means to carry said aggregate data stream, for assigning an IP address from one of said set of unique IP addresses to said radio frequency communication link, and handoff means, responsive to said radio frequency communication link being handed off to another ground-based access network means, for transmitting data indicative of said set of unique IP addresses to said another ground-based access network means.

2. The system for providing individual ground-based access network IP addresses of claim 1 wherein said subnet means further comprises:

subnet activation means for delivering data indicative of said set of unique IP addresses to said aircraft network means.

3. The system for providing individual ground-based access network IP addresses of claim 2 wherein said subnet means further comprises:

passenger database means for storing data to identify of each of said passenger wireless devices located onboard said aircraft that are activated; and correlation means for associating one of said set of unique IP addresses to said identified passenger wireless device.

4. The system for providing individual ground-based access network IP addresses of claim 1, further comprising:

wherein said ground-based access network means comprises:

data concentrator means for converting the subscriber traffic and signaling channels received from said corresponding ground-based communications network to at least one aggregate data stream; and wherein said aircraft network means further comprises:

data disaggregator means for disaggregating said at least one aggregate data stream into a plurality of data streams and delivering each of said plurality of data streams to a one of said plurality of passenger wireless devices located in said aircraft.

5. A method for providing individual ground-based access network IP addresses to a plurality of passenger wireless devices which are located onboard an aircraft, comprising:

generating, in an aircraft network located in an aircraft, radio frequency communication signals to wirelessly communicate with a plurality of passenger wireless devices located in said aircraft, comprising:

converting the subscriber traffic and signaling channels received from said plurality of passenger wireless devices located in said aircraft to at least one aggregate data stream;

exchanging, in a ground-based access network, communication signals with at least one ground-based communication network;

exchanging air-to-ground radio frequency communications between said aircraft network and said ground-based access network to carry said at least one aggregate data stream;

wherein said step of exchanging comprises:

disaggregating said at least one aggregate data stream into a plurality of data streams and delivering each of said plurality of data streams to a corresponding ground-based communications network; and managing subnet data indicative of at least one set of unique IP addresses for an associated aggregate data stream and that are available for use onboard said aircraft by each of said passenger wireless devices, comprising:

assigning, in response to said air-to-ground network means establishing a radio frequency communication link between said aircraft network and said ground-based access network to carry said aggregate data stream, an IP address from one of said set of unique IP addresses to said radio frequency communication link, and transmitting, in response to said radio frequency communication link being handed off to another ground-based access network, data indicative of said set of unique IP addresses to said another ground-based access network.

6. The method for providing individual ground-based access network IP addresses of claim 5 wherein said step of managing subnet data further comprises:

delivering data indicative of said set of unique IP addresses to said aircraft network.

7. The method for providing individual ground-based access network IP addresses of claim 6 wherein said step of managing subnet data further comprises:

storing data to identify of each of said passenger wireless devices located onboard said aircraft that are activated; and associating one of said set of unique IP addresses to said identified passenger wireless device.

8. The method for providing individual ground-based access network IP addresses of claim 5, further comprising:

wherein said step of exchanging further comprises:

converting the subscriber traffic and signaling channels received from said corresponding ground-based communications network to at least one aggregate data stream; and wherein said step of generating in said aircraft network further comprises:

disaggregating said at least one aggregate data stream into a plurality of data streams and delivering each of said plurality of data streams to a one of said plurality of passenger wireless devices located in said aircraft.

9. A system for providing individual ground-based access network IP addresses to a plurality of passenger wireless devices which are located onboard an aircraft, comprising:

aircraft-based network means, located in an aircraft, for generating radio frequency communication signals to wirelessly communicate with a plurality of passenger wireless devices located in said aircraft;

ground-based access network means for interconnecting said radio frequency communications from at least one of said plurality of passenger wireless devices with conventional Voice and Data switching systems;

inner network means for interconnecting said aircraft-based network means and said ground-based access network means to establish communications between said plurality of wireless subscriber devices and said conventional Voice and Data switching systems by exchanging both subscriber traffic and at least one of network signaling and administrative data between said aircraft network means and said conventional Voice and Data switching systems;

wherein said ground-based access network means comprises:

data concentrator means for converting the subscriber traffic and signaling channels received from said conventional Voice and Data switching systems to an aggregate data stream;

wherein said aircraft network means comprises:

data disaggregator means for converting the aggregate data stream received from said air-to-ground network means into subscriber traffic and signaling channels for said plurality of wireless subscriber devices; and subnet means for storing data indicative of at least one set of unique IP addresses for an associated aggregate data stream and that are available for use onboard said aircraft by each of said passenger wireless devices, comprising:

link address assignment means, responsive to said air-to-ground network means establishing a radio frequency communication link between said aircraft network means and said ground-based access network means to carry said aggregate data stream, for assigning an IP address from one of said set of unique IP addresses to said radio frequency communication link, and handoff means, responsive to said radio frequency communication link being handed off to another ground-based access network means, for transmitting data indicative of said set of unique IP addresses to said another ground-based access network means.

10. The system for providing individual ground-based access network IP addresses of claim 9 wherein said subnet means further comprises:

subnet activation means for delivering data indicative of said set of unique IP addresses to said aircraft network means.

11. The system for providing individual ground-based access network IP addresses of claim 10 wherein said subnet means further comprises:

passenger database means for storing data to identify each of said passenger wireless devices located onboard said aircraft that are activated; and correlation means for associating one of said set of unique IP addresses to said identified passenger wireless device.

12. The system for providing individual ground-based access network IP addresses of claim 9, further comprising:

wherein said ground-based access network means comprises:

data concentrator means for converting the subscriber traffic and signaling channels received from said corresponding Voice and Data switching systems to at least one aggregate data stream; and wherein said aircraft network means further comprises:

data disaggregator means for disaggregating said at least one aggregate data stream into a plurality of data streams and delivering each of said plurality of data streams to a one of said plurality of passenger wireless devices located in said aircraft.

13. A method for providing individual ground-based access network IP addresses to a plurality of passenger wireless devices which are located onboard an aircraft, comprising:

generating, in an aircraft-based network, radio frequency communication signals to wirelessly communicate with a plurality of passenger wireless devices located in an aircraft;

interconnecting, in a ground-based access network, said radio frequency communications from at least one of said plurality of passenger wireless devices with conventional Voice and Data switching systems;

interconnecting said aircraft-based network and said ground-based access network to establish communications between said plurality of wireless subscriber devices and said conventional Voice and Data switching systems by exchanging both subscriber traffic and at least one of network signaling and administrative data between said aircraft network and said conventional Voice and Data switching systems;

wherein said step of interconnecting in a ground-based access network comprises:

converting the subscriber traffic and signaling channels received from said conventional Voice and Data switching systems to an aggregate data stream;

wherein said step of generating in an aircraft network comprises:

converting the aggregate data stream received from said air-to-ground network into subscriber traffic and signaling channels for said plurality of wireless subscriber devices; and managing subnet data for storing data indicative of at least one set of unique IP addresses for an associated aggregate data stream and that are available for use onboard said aircraft by each of said passenger wireless devices, comprising:

assigning, in response to said air-to-ground network means establishing a radio frequency communication link between said aircraft network and said ground-based access network to carry said aggregate data stream, an IP address from one of said set of unique IP addresses to said radio frequency communication link, and transmitting, in response to said radio frequency communication link being handed off to another ground-based access network, data indicative of said set of unique IP addresses to said another ground-based access network.

14. The method for providing individual ground-based access network IP addresses of claim 13 wherein said step of managing subnet data further comprises:

delivering data indicative of said set of unique IP addresses to said aircraft network.

15. The method for providing individual ground-based access network IP addresses of claim 14 wherein said step of managing subnet data further comprises:

storing data to identify each of said passenger wireless devices located onboard said aircraft that are activated; and associating one of said set of unique IP addresses to said identified passenger wireless device.

16. The method for providing individual ground-based access network IP addresses of claim 13, further comprising:

wherein said step of exchanging further comprises:

converting the subscriber traffic and signaling channels received from said corresponding conventional Voice and Data switching systems to at least one aggregate data stream; and wherein said step of generating in said aircraft network further comprises:

disaggregating said at least one aggregate data stream into a plurality of data streams and delivering each of said plurality of data streams to a one of said plurality of passenger wireless devices located in said aircraft.

* * * * *